US012321121B2

(12) United States Patent
Tamura et al.

(10) Patent No.: US 12,321,121 B2
(45) Date of Patent: Jun. 3, 2025

(54) IMAGE FORMING SYSTEM WITH PRESSURE-BONDING OF FOLDED RECORDING MATERIAL

(71) Applicant: CANON KABUSHIKI KAISHA, Tokyo (JP)

(72) Inventors: Shuichi Tamura, Ibaraki (JP); Naoyuki Yamamoto, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/882,750

(22) Filed: Aug. 8, 2022

(65) Prior Publication Data

US 2023/0068570 A1 Mar. 2, 2023

(30) Foreign Application Priority Data

Aug. 30, 2021 (JP) ................................ 2021-140212
Jun. 27, 2022 (JP) ................................ 2022-102935

(51) Int. Cl.
*G03G 15/00* (2006.01)
*B65H 45/30* (2006.01)

(52) U.S. Cl.
CPC ......... *G03G 15/6517* (2013.01); *B65H 45/30* (2013.01); *G03G 15/6585* (2013.01); *B65H 2301/45* (2013.01); *B65H 2551/18* (2013.01)

(58) Field of Classification Search
CPC .......... G03G 15/6517; G03G 15/6585; G03G 15/6573; G03G 2215/00822; G03G 2215/00877; B65H 45/30; B65H 2301/45; B65H 2301/452; B65H 2551/18; B65H 2701/18271; B65H 2701/18272; B42D 25/47
See application file for complete search history.

(56) References Cited

U.S. PATENT DOCUMENTS 5,501,560 A * 3/1996 Blume .................... B43M 5/04 412/37
8,131,204 B2 * 3/2012 Kadota ................ G03G 15/238 399/364
2016/0313687 A1 * 10/2016 Osada ....................... B42C 3/00
2018/0305167 A1 * 10/2018 Tomimatsu ........... G06F 3/1279

FOREIGN PATENT DOCUMENTS

JP 2002-193540 A 7/2002
JP 2006011229 A * 1/2006
JP 2009051140 A * 3/2009

* cited by examiner

*Primary Examiner* — Jennifer Bahls
*Assistant Examiner* — Quang X Nguyen
(74) *Attorney, Agent, or Firm* — Venable LLP

(57) ABSTRACT

An image forming system includes an image forming unit for forming a first toner image and a second toner image on a first surface and a second surface of a recording medium by using toner containing wax; a pressure-bonding unit for pressure-bonding the recording medium folded in two by applying heat and pressure to the recording medium, an inner surface of the recording medium folded in two being pressure-bonded via an adhesive medium, one of the first surface and the second surface being the inner surface of the recording medium folded in two, the pressure-bonding unit pressure-bonding the recording medium folded in two via an adhesive member; and a control unit for determining an image forming order so that an image is formed on an outer surface of the recording medium folded in two, and then on the inner surface of the recording medium folded in two.

5 Claims, 11 Drawing Sheets

IMAGE FORMING SYSTEM WITH PRESSURE-BONDING OF FOLDED RECORDING MATERIAL

FIELD OF THE INVENTION AND RELATED ART

The present invention relates to an image forming system for preparing a pressure-bonding print by forming an image on a recording medium, folding (bending) the recording medium on which the image is formed, and pressure-bonding the recording medium under application of heat and pressure to the folded recording medium.

Conventionally, the image forming system for preparing the pressure-bonding print has been proposed. As the pressure-bonding print, it is possible to cite, for example, a pressure-bonding postcard from which a toner image formed on opposing surfaces of a recording medium folded in a valley shape (hereinafter, the opposing surfaces are referred to as pressure-bonding surfaces (sides)) cannot be read until the pressure-bonding surfaces are pseudo-bonded together and then are peeled off from each other. Here, pseudo-bonding refers to one form of bonding such that the recording medium is peelable after the bonding and is not readily bonded after the peeling.

Conventionally, as in Japanese Laid-Open Patent Application (JP-A) 2002-193540, there is a type such that a sheet onto which an adhesive is applied in advance is subjected to printing and thereafter a pressure-bonding print is prepared by subjecting the sheet to folding and then by applying pressure to pressure-bonding surfaces.

On the other hand, in recent years, for example, there is a type in which the recording medium is subjected to the pseudo-bonding by a varnish type, a film type, or the like in some instances. The varnish type is a type such that, for example, a UV-curable (UV) varnish is applied onto a recording medium on which an image is recorded (formed) and then is cured by UV irradiation, and thereafter, layers on which the varnish is applied are bonded together by applying heat and pressure to the recording medium. The film type is a type such that a recording medium on which an image is recorded is subjected to folding and a thermosensitive adhesive film is inserted into between pressure-bonding surfaces of the folded recording medium, and thereafter, adhesive layers by the film are bonded together by applying heat and pressure to the recording medium.

In the case where (as in the case of the varnish type or the film type) the image is formed on the recording medium, and thereafter, the adhesive layers are formed and are subjected to pressure-bonding processing, compared with the case where (as in the case of JP-A 2002-193540) the pressure-bonding processing is performed by the adhesive applied in advance of image formation, there arises a problem of an adhesive property between the image formed on the recording medium and the adhesive layer in some instances.

For example, in the case where the image is formed on the recording medium with toner, an adhesive property between the toner image and the adhesive layer of the varnish, the film, or the like lowers due to a parting agent contained in the toner in some instances. In the case where the adhesive property between the toner image and the adhesive layer lowers, when peeling is made, unintended peeling occurred in some instances between the adhesive contact and a layer where the toner image is formed with no peeling between the adhesive layers. Thus, in the case where the unintended peeling occurred, there was a liability that the image formed on the adhesive layer is peeled off together with the adhesive layer from the recording medium and then an image defect occurs after the peeling.

SUMMARY OF THE INVENTION

In view of the above-described problem, a principal object of the present invention is to provide an image forming system capable of suppressing an image defect after peeling in the case where a recording medium on which toner images are formed on double surfaces (sides) of the recording medium is folded (bent) and a pressure-bonding print is prepared.

According to an aspect of the present invention, there is provided an image forming system comprising: an image forming unit configured to form a first toner image on a first surface of a recording medium and to form a second toner image on a second surface, opposite from the first surface, of the recording medium, respectively, by using toner containing wax; a pressure-bonding unit configured to pressure bond the recording medium folded in two by applying heat and pressure to the recording medium, an inner surface of the recording medium folded in two being pressure-bonded via an adhesive medium, one of the first surface and second surface being an inner surface of the recording medium folded in two, the pressure-bonding unit pressure-bonding the recording medium folded in two via an adhesive member; and a control unit configured to determine an image forming order so that an image is formed on an outer surface of the recording medium folded in two, and then on the inner surface of the recording medium folded in two.

According to another aspect of the present invention, there is provided an image forming system comprising: an image forming unit configured to form a first toner image on a first surface of a recording medium and to form a second toner image on a second surface, opposite from the first surface, of the recording medium, respectively, by using toner containing wax; a pressure-bonding unit configured to pressure bond the recording medium folded in a Z-shape by applying heat and pressure to the recording medium, the recording medium is Z-folded so that the first region of the first surface of the recording medium faces each other and the second region of the second surface of the recording medium faces each other, the pressure-bonding unit pressure-bonding each of the first region and the second region of the recording medium Z-folded via an adhesive member; and a control unit configured to determine the order of image formation on the first surface and the second surface of the recording medium based on an amount of toner used for a toner image to be formed in the first region and an amount of toner used for a toner image to be formed in the second region; wherein the control unit controls the image forming unit so that the second image is formed on the second surface of the recording medium after the first image is formed on the first surface in a case where the amount of toner used in the toner image to be formed in the first area is smaller than the amount of toner used in the toner image to be formed in the second area, and wherein the control unit controls the image forming unit so that the first image is formed on the first surface of the recording medium after the second image is formed on the second surface in a case where the amount of toner used in the toner image to be formed in the second area is smaller than the amount of toner used in the toner image to be formed in the first area.

Further features of the present invention will become apparent from the following description of exemplary embodiments with reference to the attached drawings.

DESCRIPTION OF THE EMBODIMENTS

First Embodiment

<Image Forming System>

In the following, this embodiment will be described. First, an image forming system 1X of this embodiment will be described. The image forming system 1X of this embodiment includes an image forming apparatus 100 capable of executing an operation in an image forming mode for forming a toner image on a recording medium S and a pressure-bonding processing apparatus 200 capable of executing an operation in a pressure-bonding processing made for subjecting the recording medium S, on which the toner image is formed by the image forming apparatus 100, to pressure-bonding processing. The pressure-bonding processing apparatus 200 is a post-step unit retrofittable to the image forming apparatus 100 for expanding function, and the image forming apparatus 100 and the pressure-bonding processing apparatus 200 are connected to each other so as to be capable of delivering the recording medium S therebetween. This image forming system 1X is capable of preparing a pressure-bonding print such as a pressure-bonding postcard by feeding the recording medium S, on which the image is formed by the image forming apparatus 100, to the pressure-bonding processing apparatus 200 and then by folding and pressure-bonding the recording medium S by the pressure-bonding processing apparatus 200.

Figure 1:
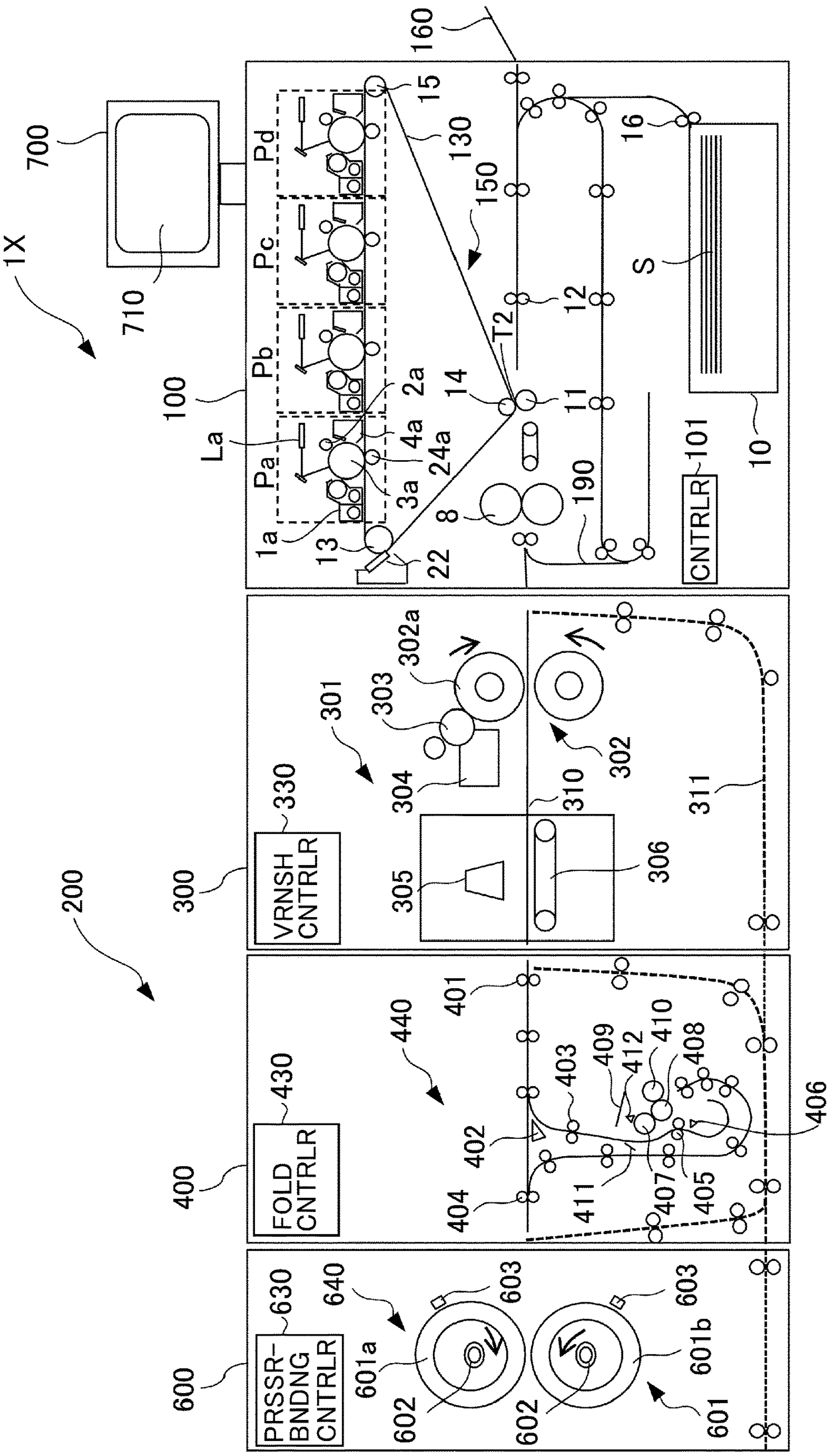
FIG. 1 is a schematic view showing an embodiment of an image forming system.

In FIG. 1, as the pressure-bonding processing apparatus 200, an apparatus including a varnish application apparatus 300, a folding processing apparatus 400, and a pressure-bonding apparatus 600 was shown as an example. The image forming apparatus 100, the varnish application apparatus 300, the folding processing apparatus 400, and the pressure-bonding apparatus 600 are connected to each other by input/output interfaces (not shown) capable of serial communication or parallel communication.

<Image Forming Apparatus>

The image forming apparatus 100 will be described. The image forming apparatus 100 is an electrophotographic full-color printer of a tandem type. The image forming apparatus 100 includes image forming portions Pa, Pb, Pc, and Pd for forming images of yellow, magenta, cyan, and black, respectively. As shown in FIG. 1, the image forming apparatus 100 forms a toner image on the recording medium S on the basis of image data sent from an original reading device (not shown) connected to an apparatus main assembly or from an external device such as a personal computer or an external controller connected to the apparatus main assembly so as to be capable of inputting and outputting data. As the recording medium S, it is possible to cite recording mediums which are sheet materials, such as plain paper, thick paper, roughened paper, uneven paper and coated paper, and which are foldable.

In the case of this embodiment, the image data includes information on a first toner image formed on one surface (side) of the recording medium S, information on a second toner image formed on the other surface (side) of the recording medium S, information on a manner of folding (for example, a folding position depending on a size of the recording medium S) or on pressure-bonding surfaces (surfaces on a valley folding side), and the like information.

As shown in FIG. 1, the image forming portions Pa, Pb, Pc, and Pd are juxtaposed along a movement direction of the intermediary transfer belt 130 in the apparatus main assembly. The intermediary transfer belt 130 is stretched by a plurality of rollers (13, 14, 15) and is rotated. Then, the intermediary transfer belt 130 carries and feeds a toner image primary-transferred in a manner described later. At a position opposing, through the intermediary transfer belt 130, an inner secondary transfer roller 14 stretching the intermediary transfer belt 130, an outer secondary transfer roller 11 is disposed, so that a secondary transfer portion T2 where the toner image on the intermediary transfer belt 130 is transferred onto the recording medium S is formed. On a side downstream of the secondary transfer portion T2 with respect to a recording medium feeding direction, a fixing device 8 is provided.

At a lower portion of the image forming apparatus 100, a cassette 10 in which recording mediums S are accommodated. The recording medium S is fed from the cassette 10 toward a registration roller pair 12 by a feeding roller 16. Thereafter, the registration roller pair 12 is started to be rotated in synchronism with the toner image formed on the intermediary transfer belt 130, so that the recording medium S is fed toward the secondary transfer portion T2. A plurality of cassettes 10 capable of accommodating the recording mediums S different in size and thickness are provided, and the recording medium S selected by a user is fed from either one of the plurality of cassette 10. Incidentally, the recording medium S is not limited to the recording medium S accommodated in the cassette 10, but the recording medium S stacked on a manual feeding tray 160 may also be fed. Further, a constitution may be employed in which the recording medium S, accommodated in an unshown sheet feeding apparatus which is used as an option and which is connected as a casing different from the image forming apparatus 100, is conveyed to the image forming apparatus 100.

The four image forming portions Pa, Pb, Pd, and Pd included in the image forming apparatus 100 have a substantially same constitution except that development colors are different from each other. Accordingly, in this embodiment, as a representative, the image forming portion Pa for yellow will be described, and other image forming portions Pb, Pc, and Pd will be omitted from illustration and description.

In the image forming portion Pa for yellow, a cylindrical photosensitive drum 3*a* is provided as a photosensitive member. The photosensitive drum 3*a* is rotationally driven in a predetermined direction at a predetermined process speed. At a periphery of the photosensitive drum 3*a*, a charging device 2*a*, an exposure device La, a developing device 1*a*, a primary transfer roller 24*a*, and a drum cleaning device 4*a* are provided.

A process for forming, for example, a full-color image by the image forming apparatus 100 will be described. First, when an image forming operation is started, a surface of the rotating photosensitive drum 3*a* is electrically charged uniformly by the charging device 2*a*. The charging device 2*a* is a corona charger or the like for charging the photosensitive drum 3*a* to a uniform negative dark-portion potential by irradiating the photosensitive drum 3*a* with charge particles with corona discharge, for example. Then, the photosensitive drum 3*a* is subjected to scanning exposure to laser light which is emitted from the exposure device La and which corresponds to an image signal. By this, an electrostatic latent image depending on the image signal is formed on the surface of the photosensitive drum 3*a*. The electrostatic latent image formed on the photosensitive drum 3*a* is developed into a toner image which is a visible image by a developer, containing toner and a carrier accommodated in the developing device 1*a*.

In the case of this embodiment, in the developing device 1*a*, as the developer, a two-component developer containing non-magnetic toner and a magnetic carrier is used. The toner contains a binder resin, a colorant, and a parting agent (wax). As the binder resin, a known binder resin can be used. For example, it is possible to use resin materials such as a vinyl copolymer represented by a styrene-(meth) acrylic copolymer, a polyester resin, a hybrid resin obtained by chemically bonding a vinyl copolymer unit and a polyester unit to each other, an epoxy resin, a styrene-butadiene copolymer, and the like. As the colorant, it is possible to use known colorants for yellow, magenta, cyan, and black, respectively.

As the parting agent, for example, it is possible to cite aliphatic hydrocarbon wax such as low-molecular weight polyethylene, low-molecular weight olefin copolymer wax, microcrystalline wax, Fischer-Tropsch wax, and paraffin wax; oxide of aliphatic hydrocarbon wax such as oxidized polyethylene wax; their block copolymers; waxes principally containing fatty acid esters such as carnauba wax and montanic acid ester wax; ester wax which is synthetic reaction product between higher aliphatic acid, such as behenyl behenate or behenyl stearate, and higher alcohol; fatty acid esters a part or all of which is deoxidized, such as deoxidized carnauba wax; and the like.

The toner image formed on the photosensitive drum 3*a* is transferred onto the intermediary transfer belt 130 at a primary transfer portion formed between the intermediary transfer belt 130 and the photosensitive drum 3*a* opposing the primary transfer roller 24*a*. At this time, to the primary transfer roller 24*a*, a primary transfer bias (voltage) is applied. After the transferring onto the intermediary transfer belt 130, toner remaining on the surface of the photosensitive drum 3*a* is removed by the drum cleaning device 4*a*.

Such an operation is sequentially performed in the image forming portions Pa, Pb, Pc, and Pd for yellow, magenta, cyan and black, respectively, so that four color toner images are superposed on the intermediary transfer belt 130. Thereafter, in synchronism with toner image forming timing, the recording medium S accommodated in the cassette 10 is fed to the secondary transfer portion T2. Then, by applying a secondary transfer bias (voltage) to the outer secondary transfer roller 11, the toner images for a full-color image are transferred onto the recording medium S. Toner remaining on the intermediary transfer belt 130 after the transferring onto the recording medium S is removed by a belt cleaning device 22. Incidentally, in the case of this embodiment, an image forming unit 150 for forming the toner images on the recording medium S is constituted by the image forming portions Pa to Pd, the intermediary transfer belt 130, the rollers (13, 14, 15), the outer secondary transfer roller 11, and the like.

The recording medium S on which the toner images are formed is fed toward the fixing device 8 as a fixing portion. The fixing device 8 includes a fixing roller and a pressing roller, and at a fixing nip formed by the fixing roller and the pressing roller, the fixing device 8 nips and feeds the recording medium S on which the toner image is formed and thus heats and presses the recording medium S, so that the toner image is fixed on the recording medium S.

The image forming apparatus 100 of this embodiment is capable of performing double-side printing. During an operation in a single-side image forming mode, the recording medium S on which the toner image is fixed on one surface side by the fixing device 8 is conveyed to the pressure-bonding processing apparatus 200. During an operation in a double-side image forming mode, the recording medium S on which the toner image is fixed on the one surface side by the fixing device 8 is conveyed toward a double-side reverse feeding portion 190. In the double-side feeding portion 190, the recording medium S is reversed while being conveyed, so that a front surface (double-side) and a back surface (second surface) of the recording medium S are replaced with each other. Then, the recording medium S is fed toward the registration roller pair 12 through the double-side feeding portion 190. Then, the recording medium S is fed by the registration roller pair 12 toward the secondary transfer portion T2 in a state in which the back surface side (second surface side) thereof where printing has not been carried out faces the intermediary transfer belt 130 side. At the secondary transfer portion T2, the toner images for a full-color image formed on the intermediary transfer belt 130 are transferred on the back surface side of the recording medium S. Thereafter, the recording medium S is subjected to toner image fixing by the fixing device 8 and the recording medium S on which the toner image is formed is conveyed to the pressure-bonding processing apparatus 200.

Thus, in the case of the double-side printing, after the toner image is fixed on the first surface side of the recording medium S, the toner image is fixed on the second surface side. Therefore, the toner image formed on the first surface side of the recording medium S passes through the fixing device 8 twice, and the toner image formed on the second surface side of the recording medium S passes through the fixing device 8 once. In the case where the toner image passes through the fixing device 8 twice, compared with the case where the toner image passes through the fixing device 8 once, wax contained in the toner is liable to be deposited on the surface of the toner by the influence of heating by the fixing device 8. Further, when a use amount (consumption amount) of the toner of the toner image formed on the recording medium S becomes large, a deposition amount of the wax contained in the toner also becomes large by the influence of heating by the fixing device 8.

Further, the image forming apparatus 100 includes a main controller 101. In the case of this embodiment, the main controller 101 has a function as a control unit which is capable of executing an image forming step of forming the image on the recording medium S, by controlling the image forming apparatus 100 and which is capable of executing a pressure-bonding processing step of subjecting the recording medium S to folding and pressure-bonding by controlling the pressure-bonding processing apparatus 200. Further, the main controller 101 has a function as an acquiring portion for acquiring image data. A control constitution of the image forming system 1X will be described later (see FIG. 2).

Next, the pressure-bonding processing apparatus 200 will be described. As shown in FIG. 1, the pressure-bonding processing apparatus 200 in this embodiment includes the varnish application apparatus 300 as an application unit, the folding processing apparatus 400 as a folding unit, and the pressure-bonding apparatus 600 as a pressure-bonding unit. The varnish application apparatus 300 applies varnish as a liquid adhesive to the surface of the recording medium S on which the image is formed by the image forming apparatus 100. The folding processing apparatus 400 folds the recording medium S so that the varnish-applied surface is an inside surface. The pressure-bonding apparatus 600 applies heat and pressure to the folded recording medium S. In the following, the varnish application apparatus 300, the folding processing apparatus 400, and the pressure-bonding apparatus 600 will be described.

<Varnish Application Apparatus>

First, the varnish application apparatus 300 will be described. In this embodiment, as a thermosensitive liquid adhesive used for pseudo-bonding the recording medium S in the varnish application apparatus 300 a UV-curable varnish (UV varnish) was employed. When the varnish application apparatus 300 is capable of adjusting an amount of the varnish applied onto the recording medium S, an application type of the varnish onto the recording medium S may be an appropriate type such as a roller application type in which the varnish is applied by an application roller or an ink jet type in which the varnish is applied by being jetted out of nozzles. In this embodiment, the roller application type (also called a roll coater type) is used.

The varnish application apparatus 300 includes a varnish processing controller 330 and a varnish application portion 301 for applying the varnish onto the recording medium S and then by drying the varnish. The varnish processing controller 330 controls principally the varnish application portion 301. The varnish application portion 301 includes an application roller pair 302, a supplying roller 303 for supplying the varnish to the application roller pair 302, a varnish storing portion 304 for storing the varnish, a drying portion 305 for drying the varnish, and a conveying belt 306 for conveying the recording medium S.

The application roller pair 302 applies the varnish onto one surface (called a varnish application surface) of the recording medium S while nipping and conveying the recording medium S fed (conveyed) from the image forming apparatus 100. The varnish applied by the application roller pair 302 is supplied to one roller **302*a* of the application roller pair 302 by the supplying roller 303. The supplying roller 303 is provided so as to be movable between a contact position where the supplying roller 303 contacts an outer peripheral surface of the roller 302*a* and supplies the varnish to the outer peripheral surface of the roller 302*a* and a separated position where the supplying roller 303 is separated from the outer peripheral surface of the roller 302*a* and does not supply the varnish to the outer peripheral surface of the roller 302*a*. The varnish storing portion 304 is a storing case for storing the varnish inside thereof, and is provided with an opening at a position higher than a varnish surface. A part of the supplying roller 303 enters the inside of the varnish storing portion 304 through the opening and is immersed into the varnish, so that the supplying roller 303 rotates and supplies the varnish to the roller 302 while being supplied with the varnish from the varnish storing portion 304. The varnish applied to the recording medium S is dried by the drying portion 305. In the case of this embodiment, the drying portion 305** is an irradiation unit for irradiating the varnish application surface of the recording medium S with ultraviolet radiation (rays).

Incidentally, the varnish application apparatus 300 includes, as a feeding passage of the recording medium S, an application passage 310 along which the varnish is applied to the recording medium S and the recording medium S is delivered to a subsequent folding processing apparatus 400, and an application avoidance passage 311 along which the varnish is not applied to the recording medium S and the recording medium S is delivered to the subsequent folding processing apparatus 400. Switching between the application passage 310 and the application avoidance passage 311 is made by an unshown flapper.

<Folding Processing Apparatus>

Next, the folding processing apparatus 400 will be described. The folding processing apparatus 400 is an apparatus for subjecting, to folding (processing) for folding the recording medium S, the recording medium S subjected to the image forming step by the image forming apparatus 100 or subjected to the image forming step and an adhesive application step by the varnish application apparatus 300. In this embodiment, as an example, the folding processing apparatus 400 of a roller press-contact type capable of folding the recording medium S in three or two is described. The folding processing apparatus 400 includes a folding processing controller 430, and a folding portion 440 for folding the recording medium S. The folding processing controller 430 principally carries out control of the folding portion 440.

An operation of the folding portion 440 will be described by taking tri-fold processing (for example, outward tri-fold processing) in which the recording medium S is folded in three in a zigzag form, as an example. The recording medium S conveyed from the varnish application apparatus 300 is drawn into the folding processing apparatus 400 by an inlet roller pair 401 and is sorted into separate folding passages by a branch flapper 402 depending on whether or not the folding processing is needed. That is, in the case where the folding processing is carried out, the recording medium S is sorted into a folding processing passage toward a folding roller pair 403, and in the case where the folding processing is not carried out, the recording medium S is sorted into a folding processing avoidance passage toward a discharging roller pair 404.

In the case where the recording medium S is sorted into the folding processing passage, the recording medium S is subjected to registration correction such that the recording medium S is once stopped at a position of a registration roller pair 405 and a loop is formed. The recording medium S subjected to the registration correction is fed again, and at a predetermined timing after the recording medium S passes through a folding position detecting sensor 406, the recording medium S is subjected to first folding processing simultaneously with drawing of the recording medium S by a first folding roller 407 and a second folding roller 408. Then, when the drawn recording medium P abuts against an abutment stopper 409, the recording medium S is subjected to second folding processing simultaneously with drawing of the recording medium S by the second folding roller 408 and a third folding roller 410. Thus, the recording medium S is folded in a first fold on a first surface side so that one surface portions oppose each other and is folded in a second fold on a second surface side so that the other surface portions oppose each other. Then, the recording medium S subjected to the second folding processing is conveyed toward the discharging roller pair 404 and is delivered to a subsequent film supplying apparatus 800 by the discharging roller pair 404. Incidentally, in the case where the recording medium S is sorted into the folding avoidance passage, the recording medium S is not subjected to the above-described tri-fold processing, and is delivered to the subsequent film supplying apparatus 800 by the discharging roller pair 404.

An operation of the folding portion 440 will be described by taking bi-fold processing as an example. In the case where the recording medium S is sorted into the folding processing passage, the recording medium S is subjected to the registration correction and then is fed again similarly as in the case of the above-described tri-fold processing. Then, in the case of the bi-fold processing, the recording medium S is drawn by the first folding roller 407 and the second folding roller 408 and passes through the folding position detecting sensor 406, and thereafter, when a trailing end of the recording medium S abuts against a trailing end abutment stopper 411, the recording medium S is subjected to the folding processing. The recording medium S is folded in two in a fold so that one surface portions oppose each other. At this time, the drawn recording medium S is guided by a leading end guide 412 moved to a predetermined position in advance, and thus is drawn by the second folding roller 408 and the third folding roller 410. The recording medium S drawn by the second folding roller 408 and the third folding roller 410 is conveyed toward the discharging roller pair 404 and is delivered to the subsequent film supplying apparatus 800 by the discharging roller pair 404. Incidentally, in the case where the recording medium S is sorted into the folding avoidance passage, the recording medium S is not subjected to the above-described bi-fold processing, and is delivered to the subsequent film supplying apparatus 800 by the discharging roller pair 404. Further, in this embodiment, in the case where the recording medium S on which the toner images are formed on double (both) surfaces (sides) is conveyed, the recording medium S is subjected to the bi-fold processing by being folded in a valley so that second surface side portions, i.e., surfaces (sides) where the toner image is formed later oppose each other.

<Pressure-Bonding Apparatus>

Next, the pressure-bonding apparatus 600 will be described. The pressure-bonding apparatus 600 is an apparatus for subjecting, to pressure-bonding for pressure-bonding the recording medium S, the recording medium S subjected to the above-described adhesive application step by the varnish application apparatus 300 and a folding processing step by the pressure-bonding apparatus 400. In this embodiment, as an example, the pressure-bonding apparatus 600 of a roller press-contact type capable of pressure-bonding processing of the recording medium S by applying heat and pressure to the recording medium S through the pressure-bonding roller pair nipping and conveying the recording medium S is described. The pressure-bonding apparatus 600 includes a pressure-bonding region controller 630, and a pressure-bonding portion 640 for pressure-bonding the recording medium S. The pressure-bonding processing controller 630 principally carries out control of the pressure-bonding portion 640.

The pressure-bonding portion 640 will be described. The pressure-bonding portion 640 includes a pressure-bonding roller pair 601 for nipping and feeding the recording medium S by rotation, a heater 602 for heating the pressure-bonding roller pair 601, and a thermistor 603 for detecting a temperature of the pressure-bonding roller pair 601. The pressure-bonding roller pair 601 includes an upper roller 601*a* and a lower roller 601*b*, and each of the upper roller 601*a* and the lower roller 601*b* is maintained at a predetermined temperature by the heater 602 depending on a detection temperature of the thermistor 603. Then, the pressure-bonding roller pair 601 is capable of applying heat and pressure to the recording medium S while nipping and feeding the recording medium S in a folded state. By this, the recording medium S folded so that an application surface on which the varnish is applied is positioned inside thereof is subjected to pseudo-bonding in a manner such that opposing application surface portions are bonded together by the varnish.

<Control Constitution of Image Forming System>

Next, control of the image forming system 1X will be described using FIG. 2 while making reference to FIG. 1. In this embodiment, the case where the image forming apparatus 100 (specifically, the main controller 101) unitarily manages an operation instruction to the pressure-bonding processing apparatus 200 (the varnish application apparatus 300, the folding processing apparatus 400, and the pressure-bonding apparatus 600) and controls the apparatuses will be described as an example. Incidentally, in addition to the devices illustrated in FIG. 2, various devices such as motors and power sources are connected, but are not the main object of the present invention herein, and therefore, will be omitted from illustration and description.

Figure 2:
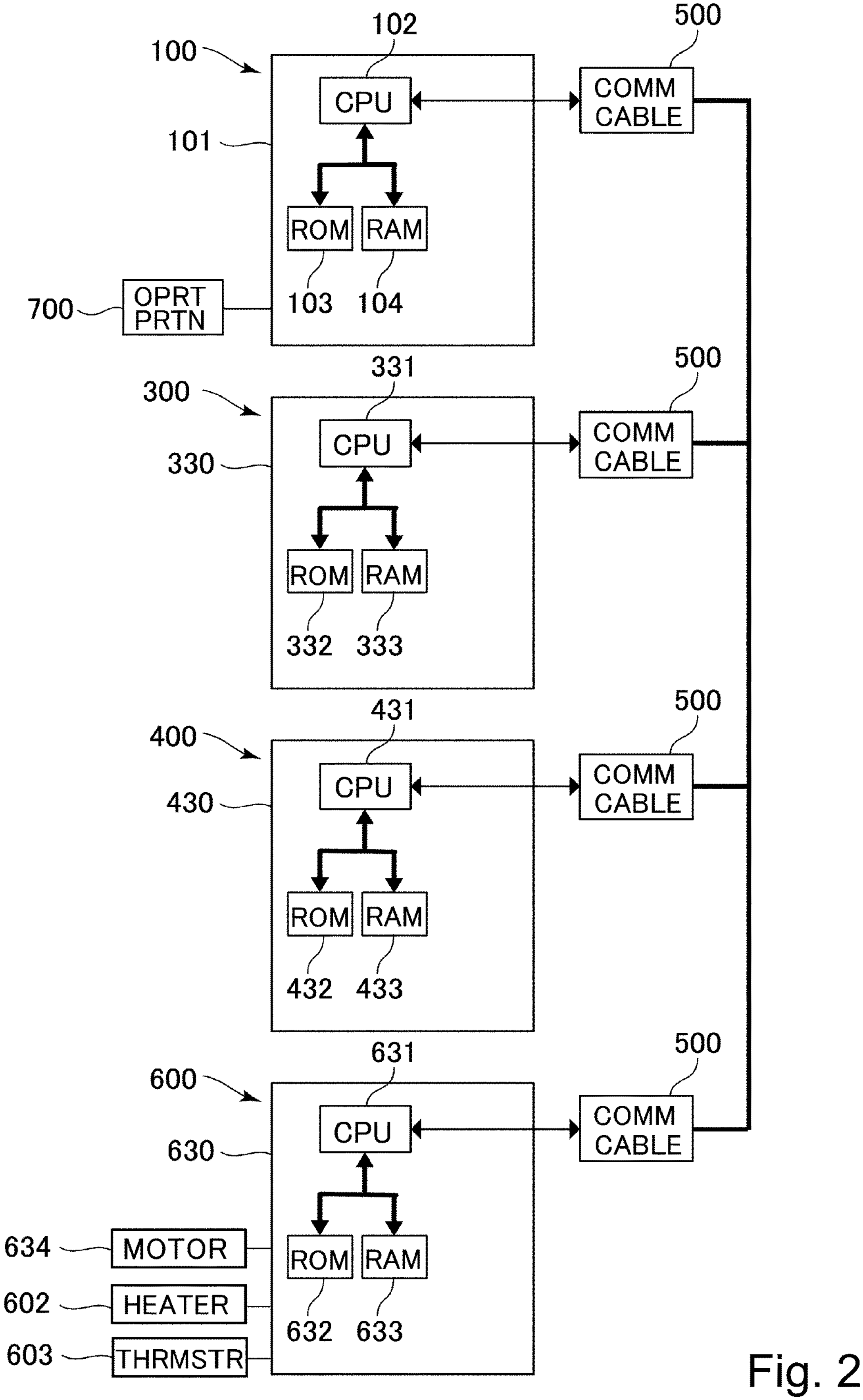
FIG. 2 is a control block diagram of the image forming system.

In the image forming system 1X of this embodiment, as shown in FIG. 2, to the main controller 101, the varnish processing controller 330, the processing controller 430, and the pressure-bonding processing controller 630 are connected via communication cables 500 so as to be capable of communicating operation instructions and various data. In accordance with the operation instructions from the main controller 101, the varnish processing controller 330 causes the varnish application apparatus 300 to operate, the folding processing controller 430 causes the folding processing apparatus 400 to operate, and the pressure-bonding processing controller 630 causes the pressure-bonding apparatus 600 to operate. That is, while the main controller 101 controls the operation of the image forming apparatus 100, the main controller 101 is capable of controlling entirety of the image forming system 1X by sending the operation instructions to the pressure-bonding processing apparatus 200 (the varnish application apparatus 300, the folding processing apparatus 400, and the pressure-bonding apparatus 600).

The main controller 101, the varnish processing controller 330, the folding processing controller 430, and the pressure-bonding processing controller 630 which are described above may have the same constitution. For example, each of the controllers includes a CPU (central processing unit), a ROM (read only memory), and a RAM (random access memory). Further, each of the controllers includes an ASIC (application specific integrated circuit).

The main controller 101 includes the CPU 102, the ROM 103, and the RAM 104. In the ROM 103 and the RAM 104, there are various programs and various data for a pressure-bonding print preparing process (see FIG. 3 or FIG. 7) described later. Incidentally, the RAM 104 is capable of temporarily storing a calculation (computation) processing result or the like with execution of the various programs.

The image forming apparatus 100 includes an operating portion 700 including, for example, a liquid crystal display portion (see, FIG. 1), and the operating portion 700 as a selecting unit is connected to the main controller 101. The operating portion 700 is, for example, a touch panel, and on a liquid crystal display portion 710, various screws presenting the various programs and various data or the like can be displayed. Further, the operating portion 700 receives input of a start of the various programs and input of the various data depending on a user operation such as a touch operation by the user.

The user is capable of inputting a start of an "imaging job" from the operating portion 700 and is capable of making setting for preparing the pressure-bonding print through the operating portion 700. In the case where the "image forming job" is inputted, the CPU 102 executes the pressure-bonding print preparing process (program) stored in the ROM 103. With this execution, together with the image forming apparatus 100, the pressure-bonding processing apparatus 200 (the varnish application apparatus 300, the folding processing apparatus 400, and the pressure-bonding apparatus 600) is capable of being operated.

The varnish processing controller 330 includes a CPU 331, a ROM 332, and a RAM 333. The CPU 331 causes the varnish application apparatus 300 to operate on the basis of a control program stored in the ROM 332. The folding processing controller 430 includes a CPU 431, a ROM 432, and a RAM 433. The CPU 431 causes the folding processing apparatus 400 to operate on the basis of a control program stored in the ROM 432.

The pressure-bonding processing controller 630 includes a CPU 631, a ROM 632, and a RAM 633. The CPU 631 causes the pressure-bonding apparatus 600 to operate on the basis of a control program stored in the ROM 632. To the pressure-bonding processing controller 630, a motor 634 for rotationally driving the pressure-bonding roller pair 601, a heater 602 for heating the pressure-bonding roller pair 601, and a thermistor 603 for detecting a temperature of the pressure-bonding roller pair 601. The pressure-bonding processing controller 630 sends a detection result (temperature data) of the thermistor 603 to the main controller 101. Then, the pressure-bonding processing controller 630 is capable of changing the temperature of the heater 602 by receiving a target temperature from the main controller 101. Further, the pressure-bonding processing controller 630 is capable of changing the number of rotations of the motor 634 by receiving a target speed of the fed recording medium 101 from the main controller 101.

<Pressure-Bonding Print Preparing Processing>

Next, the pressure-bonding print preparing processing in the first embodiment will be described using FIG. 3, FIG. 4A, and FIG. 4B while making reference to FIGS. 1 and 2. For preparing a pressure-bonding print by folding the recording medium S in two, the pressure-bonding print preparing processing in this embodiment is started to be executed by the main controller 101 with, for example, input of the start of the "image forming job" from the operating portion 700.

Figure 3:
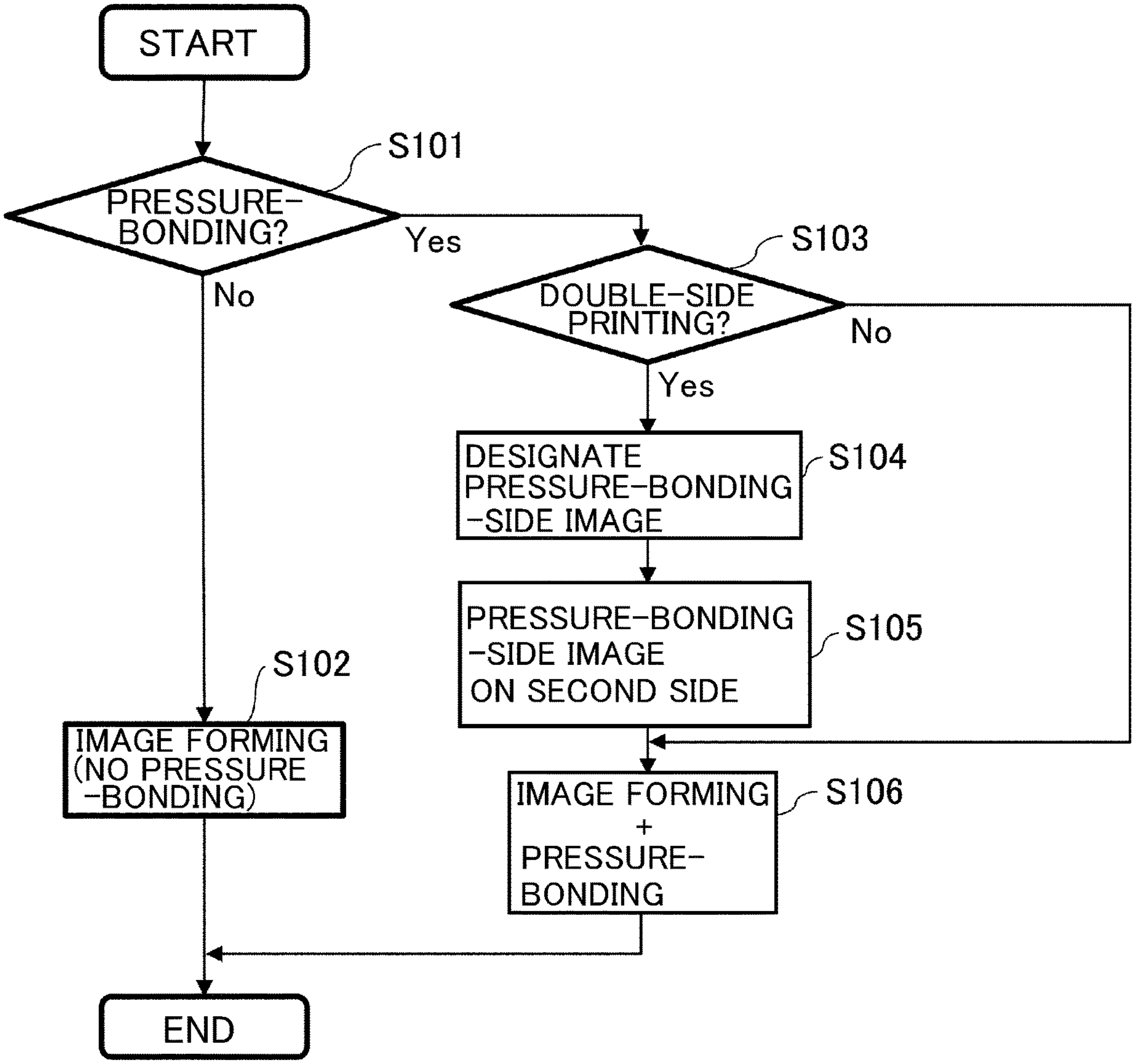
FIG. 3 is a flowchart showing pressure-bonding print preparation processing in a first embodiment.

As shown in FIG. 3, the main controller 101 discriminates whether or not the pressure-bonding print is prepared by executing bi-fold pressure-bonding processing of the recording medium S (S101). As regards whether or not the pressure-bonding processing of the recording medium S is executed, as described above, in the case where setting for preparing the pressure-bonding print is made, discrimination of "execution" is made, and in the case where the setting of preparing the pressure-bonding print is not made, discrimination of "non-execution" is made. In the case where the pressure-bonding processing of the recording medium S is not executed (No of S101), the main controller 101 causes the image forming apparatus 100 to form the toner image on the recording medium S on the basis of the image data (S102). In this case, when the image forming job is "double-side printing", the toner images are formed on double (both) sides, and when the image forming job is "one-side printing", the toner image is formed on one side of the recording medium S. However, after the image formation, the recording medium S is not subjected to the pressure-bonding processing by the pressure-bonding processing apparatus 200 (no pressure-bonding processing). Accordingly, the recording medium S on which the toner images are formed on the double sides or the toner image is formed on the one side is only outputted as it is, and the pressure-bonding print is not prepared.

In the case where the recording medium S is subjected to the bi-fold pressure-bonding processing (Yes of S101), the main controller 101 discriminates whether or not the image forming job is the "double-side printing" (S103). In the case where the image forming job is not the "double-side printing" (No of S103), the main controller 101 causes the sequence to jump to processing of a step S106. In the step S106, the main controller 101 causes the image forming apparatus 100 to form the toner image on one side of the recording medium S on the basis of the image data and causes the pressure-bonding processing apparatus 200 to perform the pressure-bonding processing (S106). That is, the pressure-bonding print is thus prepared.

On the other hand, in the case where the image forming job is the "double-side printing" (Yes of S103), the main controller 101 causes the operating portion 700 to display an "image selection screen" and then receives selection of a pressure-bonding side (surface) depending on an operation of the operating portion 700 by the user (S104). In the case where selection of the pressure-bonding side is made, in this embodiment, an order of toner image formation based on the image data is changed so that a toner image which is either one of a first toner image formed on a side and a second toner image formed on a side, in which either one of these sides is selected as the pressure-bonding side, and the toner image formed on the side selected as the pressure-bonding side is formed on a second side (S105). Then, the main controller 101 causes the image forming apparatus 100 to form the toner images on the double sides on the basis of the order of toner image formation set in S105, and causes the pressure-bonding processing apparatus 200 to perform the pressure-bonding processing (S106). That is, the pressure-bonding print is thus prepared. Here, in the case of Yes of S103, the image forming job is the "double-side printing", so that the toner images are formed on the double sides. However, in response to the selection of the pressure-bonding side by the user in S104, the order of the toner images formed on the recording medium S is replaced for the image data so that the toner image formed on the side (pressure-bonding side) where the recording medium S is folded in a valley is formed on the second side of the recording medium S. That is, in response to the selection of the pressure-bonding side by the user, the order of toner image formation, defined by the image data, of the toner image formed on the first side (which is the side where the toner image is formed at a first time, and this toner image passes through the nip of the fixing device 8 twice) and the toner image formed on the second side (which is the side where the toner image is formed at a second time, and this toner image passes through the nip of the fixing device 8 once), is changed. Thus, in this embodiment, for the toner image formed on the pressure-bonding side, a deposition amount of the wax contained in the toner is suppressed. In the following, details thereof will be described.

Figure 4A:
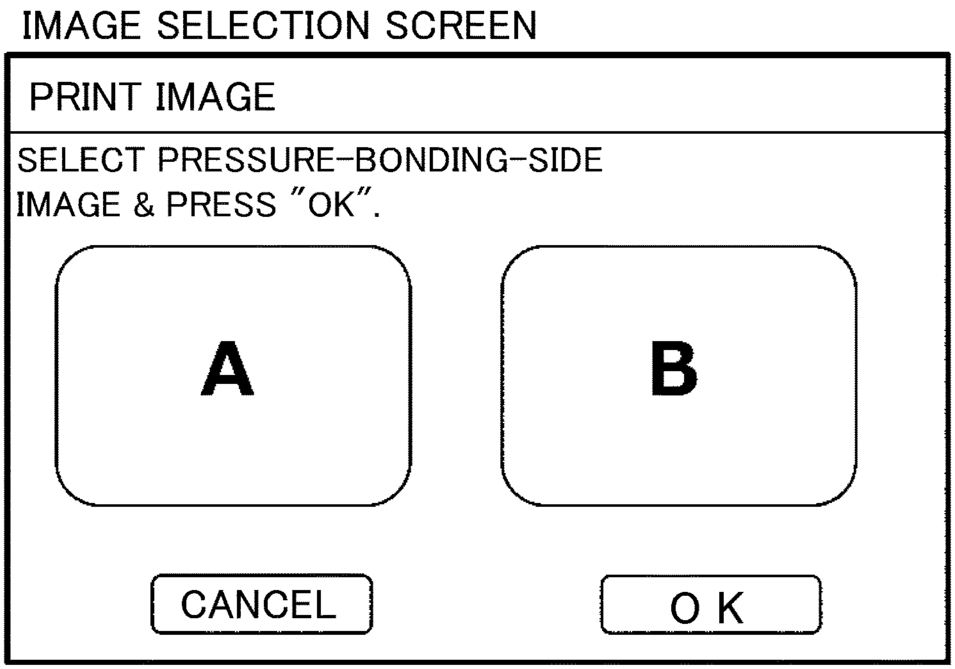
FIG. 4A is a schematic view showing an image selection screen.
Figure 4B:
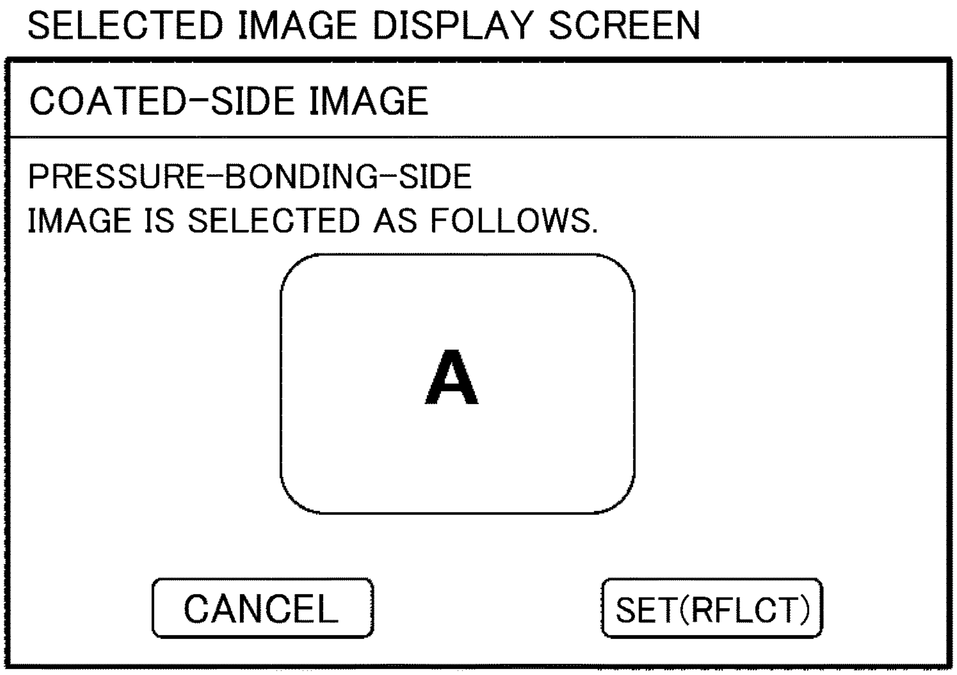
FIG. 4B is a schematic view showing a display screen of a selected image.

The "image selection screen" for selecting the pressure-bonding side by the user in S104 and through which the user is capable of selecting the pressure-bonding side of the recording medium S is shown in FIG. 4A, and a display screen of the toner image formed on the pressure-bonding side selected through the "image selection screen" is shown in FIG. 4B. As shown in FIG. 4A, on the "image selection screen", a first toner image "A" defined in the image data so as to be formed on the first side and a second toner image "B" defined in the image data so as to be formed on the second side are displayed side by side. The user is capable of selecting, as the pressure-bonding side (which is a valley-folded side), either one of the side on which the first toner image "A" is formed and the side on which the second toner image "B" is formed, which are displayed on the "image selection screen".

The toner image formed on the side selected as the pressure-bonding side through the "image selection screen" is displayed on the "toner image display screen" as shown in FIG. 4B. On the "toner image display screen" shown in FIG. 4B, a "setting reflection" button is displayed. In the case where the "setting reflection" button is operated by the user, the toner image displayed on the "toner image display screen" is set as the toner image formed on the pressure-bonding side. In an example shown in FIG. 4B, the first toner image "A".

In this embodiment, the order of formation of the first toner image "A" and the second toner image "B" based on the image data is changed so that the first toner image "A" set as the toner image formed on the pressure-bonding side is formed after the second toner image "B" is formed on the recording medium S. In the case of the example shown in FIGS. 4A and 4B, in the image data, the toner image formation order is defined so that the first toner image "A" is formed on the first side and the second toner image "B" is formed on the second side. This toner image formation order is changed in accordance with a user instruction in S104 so that the first toner image "A" is formed on the second side and the second toner image "B" is formed on the first side.

<Evaluation of Adhesive Property>

The present inventors conducted an experiment for evaluating an adhesive property between the UV varnish and the toner image depending on the above-described change in toner image formation order. In the experiment, a toner image was formed on a recording medium S ("Coated Cardboard", 270 g/m$^2$, manufactured by Hokuetsu Package Co., Ltd.) in a toner use amount of 1.2 mg/cm$^2$ at a process speed of 464 mm/s, and then was fixed by the fixing device. Further, a melting point of wax contained in toner used is 77° C., and a toner softening point is 104° C.

Then, when a fixing roller for heating the recording medium S is in a state in which a temperature thereof is 185° C., the recording medium S was passed through the nip of the fixing device in two modes consisting of "SHEET PASSING (TWICE)" on the assumption of the first surface side of the double-side printing and "SHEET PASSING (ONCE)" the assumption of the second surface side of the double-side printing. The "SHEET PASSING (TWICE)" is the case where the recording medium S is passed through the nip of the fixing device twice in total so that the toner image-formed surface faces the fixing roller side at the first time and the reversed toner image-formed surface faces the pressing roller side at the second time. The "SHEET PASSING (ONCE)" is the case where the recording medium S is passed through the nip of the fixing device only once so that the toner image contacts the fixing roller.

Under the above-described condition, after the toner image was fixed, varnish ("UV VECTA Coating Varnish PC-3KW2", manufactured by T&K TOKA Corporation) was coated in a thickness of 5 μm by a bar coater. Thereafter, the varnish was cured by irradiation with ultraviolet rays with use of a high-pressure mercury-vapor lamp so that an integrated light quantity is 120-130 mJ/cm$^2$.

Figure 5:
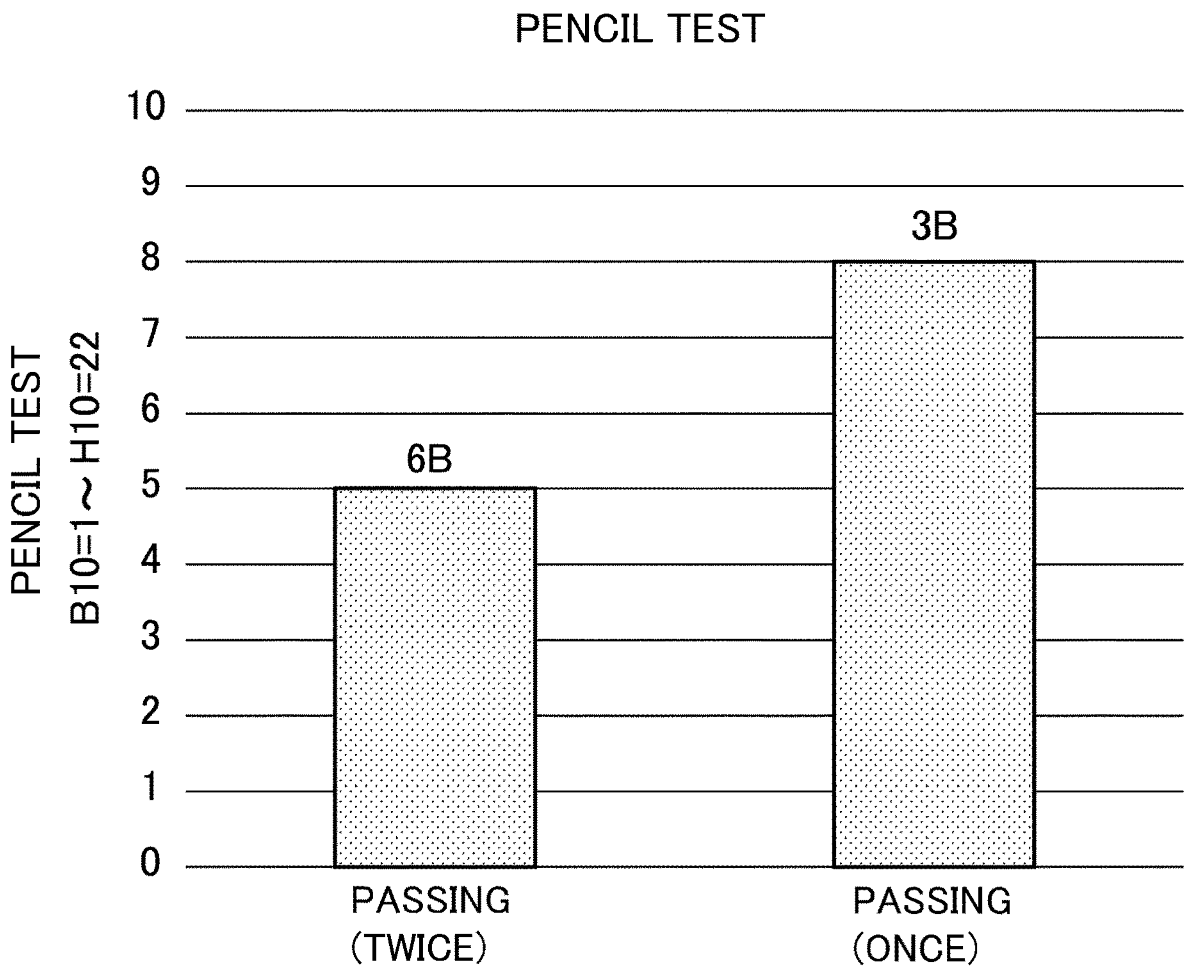
FIG. 5 is a graph showing a result of a scratch hardness test on a first surface (side) and a second side.

The evaluation of the adhesive property between the UV varnish and the toner image was made by scratch hardness (pencil method) which is standardized by "JIS K5600-5-4". FIG. 5 shows a result of the scratch hardness test as an adhesive property evaluation of coating on the toner image in the above-described experiment. In FIG. 5, the ordinate represents a numerical value represented by numerals from 1 to 10 for 10 stages of the pencil hardness from B10 to B1 on condition that a pencil B10 is "1" and a pencil B1 is "10". In FIG. 5, each of "3B" and "6B" indicated correspondingly to the "SHEET PASSING (ONCE)" and the "SHEET PASSING (TWICE)", respectively in the graph represents the pencil hardness acquired in the scratch hardness test.

As can be understood from the result shown in FIG. 5, a level of the adhesive property is better in the "SHEET PASSING (ONCE)" than the "SHEET PASSING (TWICE)". Accordingly, when the pressure-bonding print folded in two is prepared, in the case where the pressure-bonding side is the second (surface) side, compared with the case where the pressure-bonding side is the first (surface) side, the adhesive property between the UV varnish and the toner image can be improved.

As described above, in this embodiment, in the case of an operation in a double-side image forming mode, the image to be formed on the surface of the recording medium which is the pressure-bonding side can be made selectable by the user through the operating portion 700. By this, in the case where the images are formed on the double (both) sides of the recording medium and the recording medium is subjected to the pressure-bonding processing, the toner image is formed on the second side selected as the pressure-bonding side.

As described above, the toner image formed on the first side of the recording medium passes through the nip of the fixing device 8 twice, and the toner image formed on the second side of the recording medium passes through the nip of the fixing device 8 once. In the case where the toner image passes through the nip of the fixing device 8 twice, compared with the case where the toner image passes through the nip of the fixing device 8 once, a time, in which the recording medium is heated by the fixing device 8 is long, and therefore, the wax contained in the toner is liable to be deposited on the surface of the toner image. Accordingly, in the case where the varnish is applied onto the toner image formed on the first side of the recording medium S, compared with the case where the varnish is applied onto the second side of the recording medium S, the adhesive property of the varnish to the toner image is poor.

In general, in the case where opposing surfaces (sides) (which are called pressure-bonding surfaces (sides)) of the recording medium folded in the valley are superposed with each other and are subjected to pseudo bonding with the varnish, varnish-formed layers are pseudo-bonded together. Then, the varnish-formed layers are peeled off from each other, so that the user can visually recognize the toner image formed as a layer under the varnish-formed layer. However, in the case where the adhesive property between the varnish and the toner image is poor, in some instances, the varnish-formed layers are not peeled off from each other, and unintended peeling occurs between the varnish-formed layer and the toner image-formed layer.

Therefore, in this embodiment, in the case where the varnish-applied surfaces (sides) of the recording medium S on which the toner images are formed on the double sides are folded in two (valley folding, V-shaped folding) so as to oppose each other, the toner image formed on the pressure-bonding side is formed on the second side of the recording medium S, so that a deposition amount of the wax from the toner image formed on the pressure-bonding side can be suppressed. By this, the adhesive property between the varnish and the toner image can be improved, so that it is possible to suppress that unintended peeling occurs between the varnish-formed layer and the toner image-formed layer.

Incidentally, in the above-described embodiment, there is a constitution in which selection of the pressure-bonding side is received depending on the operation of the operating portion 700 by the user, but the main controller 101 may carry out control so as to select the pressure-bonding side and then to form the pressure-bonding side as the second side of the recording medium S. For example, the control may be carried out by detecting an address side on the basis of inputted image data and then by using the side, where the address side is not detected, as the pressure-bonding side.

Figure 6:
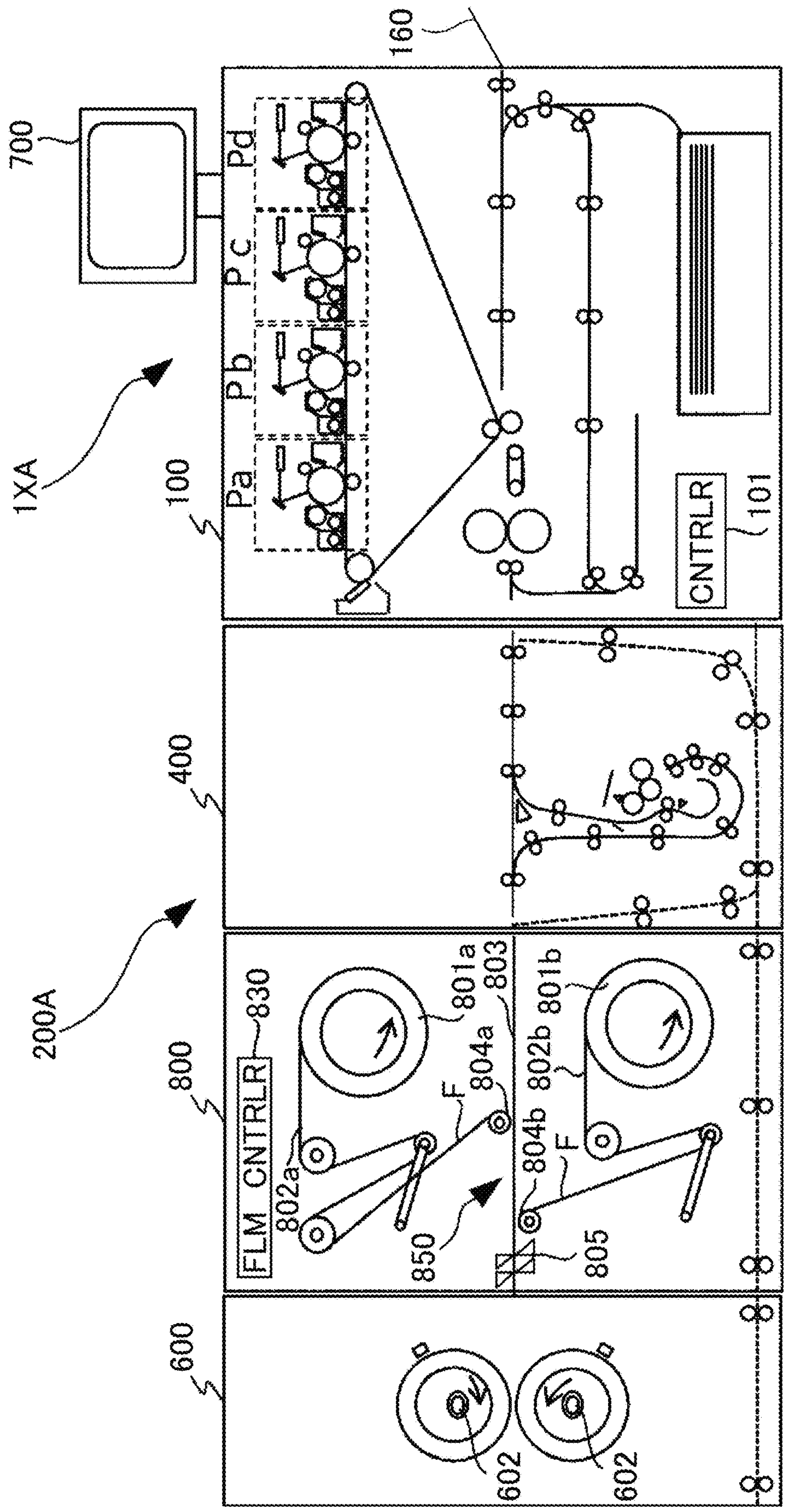
FIG. 6 is a schematic view showing another embodiment of the image forming system.

Incidentally, in the above-described embodiment, an example in which the varnish application apparatus (varnish coater) 300 using the UV-curable varnish (UV varnish) for subjecting the recording medium S to the pseudo bonding was employed was described, but the present invention is not limited thereto. A film supplying apparatus using an adhesive film may be employed. FIG. 6 shows an image forming system 1XA employing a film supplying apparatus 800. Incidentally, in FIG. 6, constituent elements similar to those of the image forming system 1X shown in FIG. 1 are represented by the same reference numerals or symbols and will be briefly described or omitted from description.

<Film Supplying Apparatus>

As shown in FIG. 6, the image forming system 1XA is different from the above-described image forming system 1X (see, FIG. 1) and includes a pressure-bonding processing apparatus 200A including the folding processing apparatus 400, the film supplying apparatus 800, and the pressure-bonding apparatus 600. That is, the pressure-bonding processing apparatus 200A includes the folding processing apparatus 400 for folding the recording medium S on which the image is formed, the film supplying apparatus 800 for supplying a thermosensitive adhesive film F to the inside of the folded recording medium S, and the pressure-bonding apparatus 600 for applying heat and pressure to the folded recording medium S. The varnish application apparatus 300 (see, FIG. 1) receives the recording medium S from the image forming apparatus 100 and conveys the recording medium S toward the folding processing apparatus 400, but the film supplying apparatus 800 receives the recording medium S from the folding processing apparatus 400 and conveys the recording medium S toward the pressure-bonding apparatus 600.

The film supplying apparatus 800 includes a film supply controller 830, film rollers 801*a* and 801*b* around which the adhesive film F is wound, and a film supplying portion 850 for supplying the adhesive film F to the recording medium S. The film supply controller 830 principally carries out control of the film supplying portion 850. The adhesive film F is prepared by, for example, for forming an adhesive layer for generating an adhesive force under application of heat and pressure to each of a front surface (side) and a back surface (side) of a bonded two layer-transparent film.

An elongated adhesive film F wound around the film rollers 801*a* and 801*b* is successively supplied along predetermined film supply passages 802*a* and 802*b*, respectively. The adhesive film F is supplied so as to be sandwiched between folded portions of the recording medium S when the recording medium S folded in three reaches each of a crossing region 804*a* between a feeding passage 803 and the film supply passage 802*a* and a crossing region 804*b* between the feeding passage 803 and the film supply passage 802*b*. Thereafter, the adhesive film F is cut in a desired dimension by a cutting member 805. On the other hand, the adhesive film F is supplied so as to be sandwiched between folded portions of the recording medium S when the recording medium S folded in two reaches the crossing region 804*a* between the feeding passage 803 and the film supply passage 802*a*. Thereafter, the adhesive film F is cut in a desired dimension by the cutting member 805.

Thus, even in the case of the image forming system 1XA including the pressure-bonding processing apparatus 200A in which the recording medium S is subjected to the pressure-bonding processing with use of the adhesive film F, it is possible to apply the above-described first embodiment.

Second Embodiment

Next, the pressure-bonding print preparing processing in a second embodiment will be described using FIGS. 7 to 11 while making reference to FIGS. 1 and 2. For preparing a pressure-bonding print by folding the recording medium S in three, the pressure-bonding print preparing processing in this embodiment is started to be executed by the main controller 101 with, for example, input of the start of the "image forming job" from the operating portion 700. Incidentally, in the following description, processing similar to the above-described pressure-bonding print preparing processing (see, FIG. 3) in the first embodiment will be briefly described or omitted from description.

Figure 7:
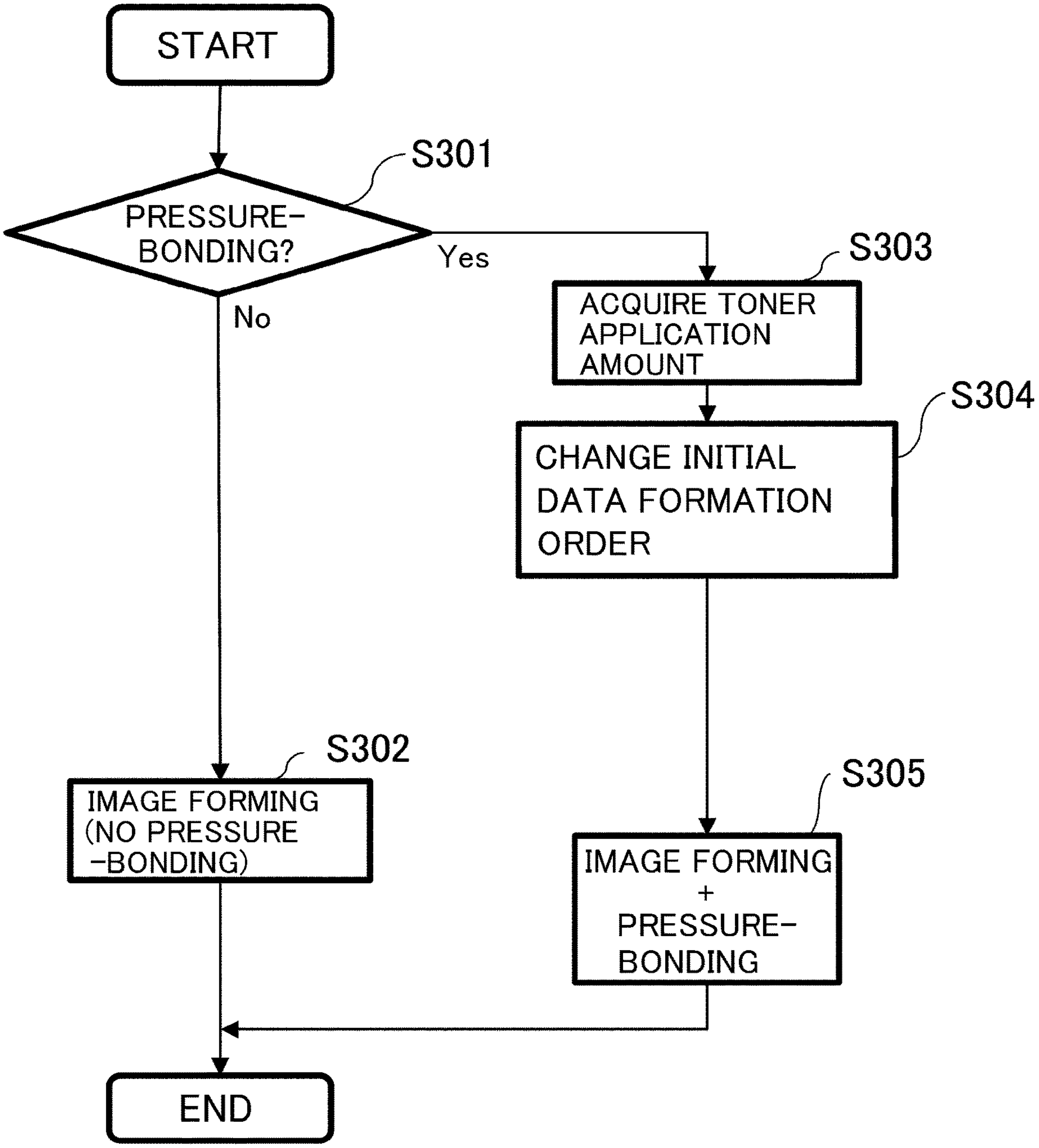
FIG. 7 is a flowchart showing pressure-bonding print preparation processing in a second embodiment.

As shown in FIG. 7, the main controller 101 discriminates whether or not the pressure-bonding print is prepared by executing tri-fold pressure-bonding processing of the recording medium S (S301). In the case where the tri-fold pressure-bonding processing of the recording medium S is not executed (No of S301), the main controller 101 causes the image forming apparatus 100 to form the toner image on the recording medium S on the basis of the image data (S302). In this case, the toner images are formed on double (both) sides, but after the image formation, the recording medium S is not subjected to the pressure-bonding processing by the pressure-bonding processing apparatus 200 (no pressure-bonding processing). Accordingly, the recording medium S on which the toner images are formed on the double sides is only outputted as it is, and the pressure-bonding print is not prepared.

In the case where the recording medium S is subjected to the tri-fold pressure-bonding processing (Yes of S301), the main controller 101 acquires, on the basis of the image data, a toner use amount of a first toner image formed on a first pressure-bonding side and a toner use amount of a second toner image formed on a second pressure-bonding side (S303). Here, the first pressure-bonding side is a pressure-bonding side on the first surface side (side where the toner image is formed at the first time) where the recording medium is folded in the valley when the recording medium is folded in the Z-shape, and the second pressure-bonding side is a pressure-bonding side on the second surface side (side where the toner image is formed at the second time) where the recording medium is folded in the valley when the recording medium is folded in the Z-shape. These first and second pressure-bonding sides are included as pressure-bonding side data in the image data inputted to the main controller 101. On the basis of the image data, the main controller 101 counts the number of video counts obtained by integrating image signal output levels for each pixel on the first pressure-bonding side and the second pressure-bonding side and thus is capable of acquiring a toner use amount of the toner image used in a range of the first pressure-bonding side and a toner use amount of the toner image used in a range of the second pressure-bonding side. Incidentally, the range of the first pressure-bonding side and the range of the second pressure-bonding side have the same area.

The main controller 101 changes the order of formation of the first toner image and the second toner image based on the image data so that the toner image, of the first toner image and the second toner image, larger in toner use amount is formed on the second side (S304). Then, on the basis of the toner image formation order set in S304, the main controller 101 causes the image forming apparatus 100 to form the toner images on the double sides of the recording medium S and causes the pressure-bonding processing apparatus 200 to perform the pressure-bonding processing (S305). That is, the pressure-bonding print is thus prepared. In this case, the image forming job is the "double-side printing", so that the toner images are formed on the double sides of the recording medium S. However, when the toner image to be formed on the pressure-bonding side of the recording medium S is designated, the designated toner image is formed on a side where the recording medium S is folded in the valley (i.e., the pressure-bonding side). In this case, in order to suppress the deposition amount of the wax contained in the toner on the toner image formed on the pressure-bonding side, in this embodiment, the order of formation of the toner images formed on the first side and the second side defined in the image data is changed. In the following, details thereof will be described.

Incidentally, the above-described pressure-bonding print preparing processing in the second embodiment is applicable to either of an apparatus in which the recording medium S is subjected to the pressure-bonding processing with use of the varnish by the pressure-bonding processing apparatus and an apparatus in which the recording medium S is subjected to the pressure-bonding processing with use of the adhesive film F. Hereinafter, the case where the recording medium S is subjected to the tri-fold pressure-bonding processing with use of the adhesive film F will be described.

Figure 8A:
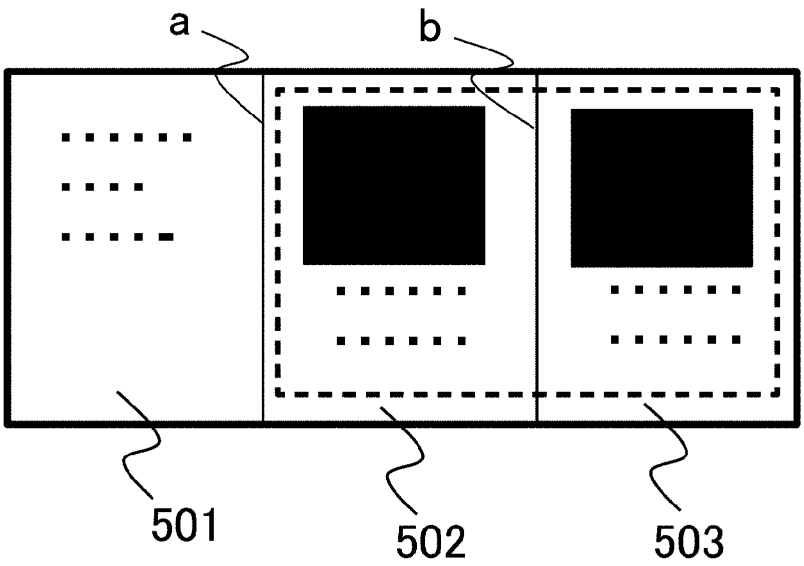
FIG. 8A is a first example of a toner image formed on a first surface on the basis of image data.
Figure 8B:
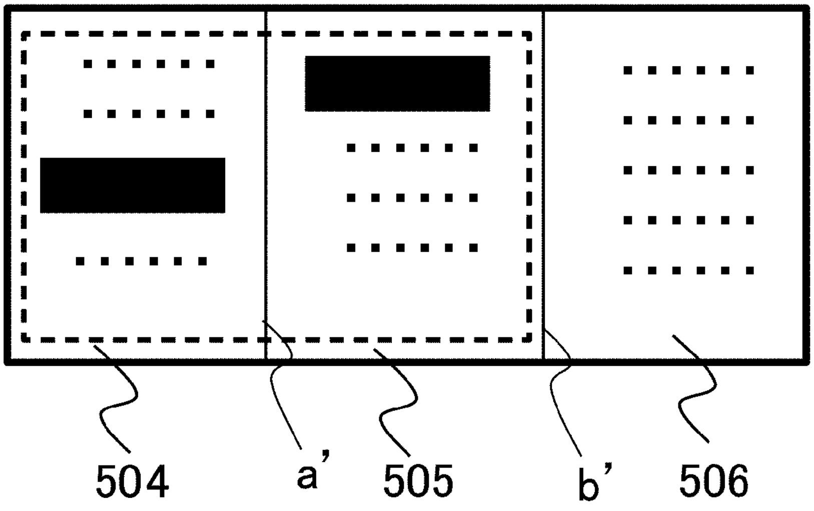
FIG. 8B is a first example of a toner image formed on a second surface on the basis of image data.
Figure 9A:
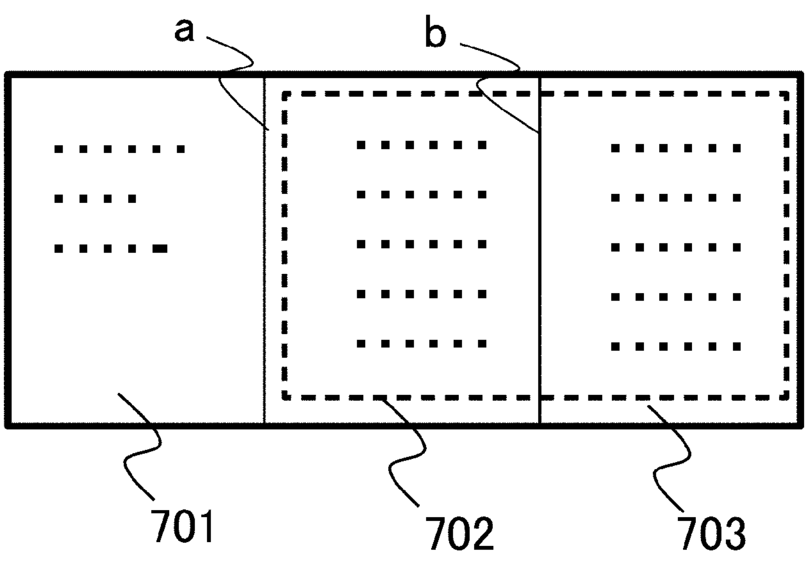
FIG. 9A is a second example of the toner image formed on a first surface on the basis of image data.
Figure 9B:
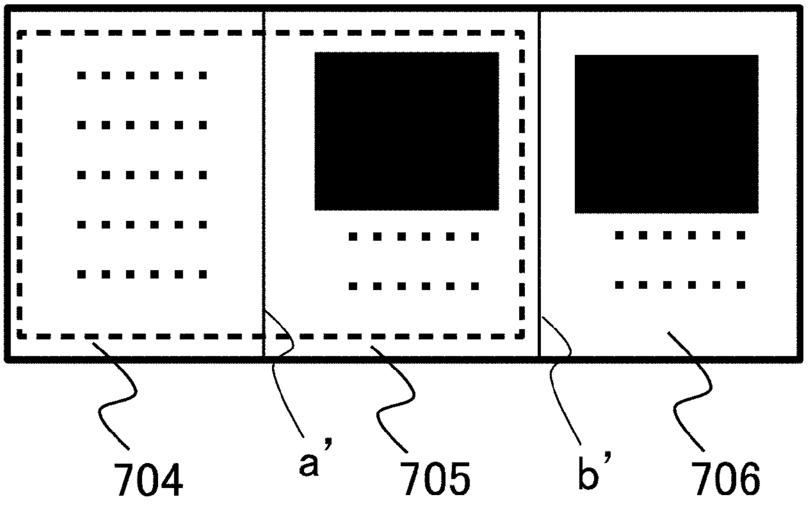
FIG. 9B is a second example of the toner image formed on a second surface on the basis of image data.
Figure 10A:
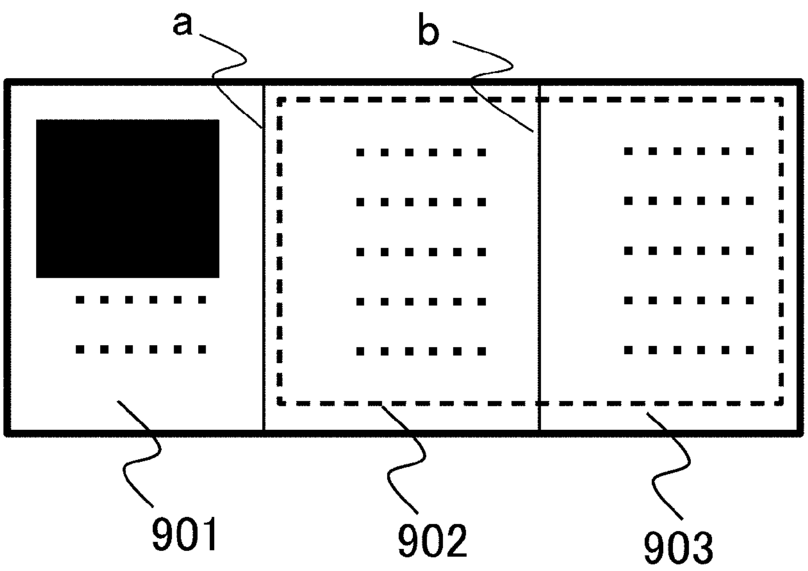
FIG. 10A is a third example of the toner image formed on a first surface on the basis of image data.
Figure 10B:
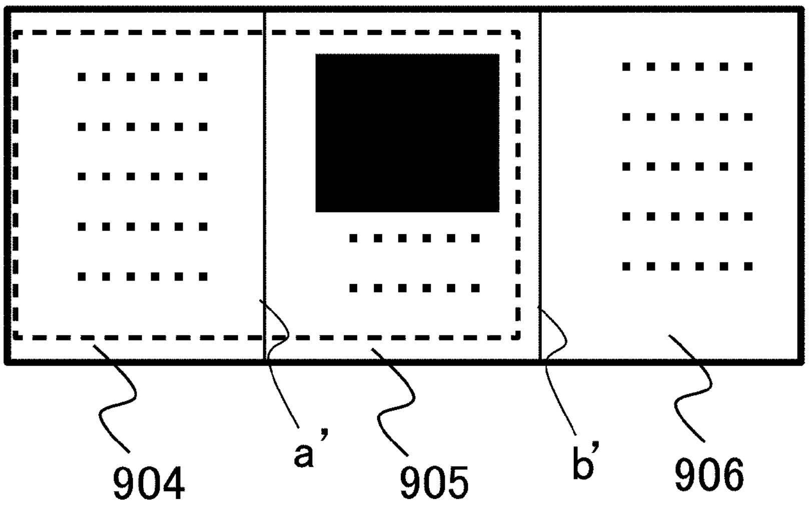
FIG. 10B is a third example of the toner image formed on a second surface on the basis of image data.

The above-described change in toner image formation order will be specifically described by enumerating an example. FIGS. 8A and 8B show a first example, FIGS. 9A and 9B show a second example, and FIGS. 10A and 10B show a third example. In these figures, each of FIGS. 8A, 9A, and 10A shows a toner image defined on the basis of the image data so as to be formed on the first side of the recording medium S, and each of FIGS. 8B, 9B, and 10B shows a toner image defined on the basis of the image data so as to be formed on the second side of the recording medium S.

In the case of the tri-fold pressure-bonding processing for forming a pressure-bonding postcard or the like, when the recording medium is viewed from the first surface side as shown in FIG. 8A, the recording medium is folded in a mountain in a fold a between a first region 501 and a second region 502 and is folded in a valley in a fold b (first fold) between the second region 502 and a third region 503. On the other hand, when the recording medium is viewed from the second surface side as shown in FIG. 8B, in a fold a' (second fold) on a back side of the fold a, the recording medium is folded in the valley, and in a fold b' on a back side of the fold b, the recording medium is folded in the mountain. The fold a' is positioned between a fourth region 504 and a fifth region 505 as shown in FIG. 8B, and the fold b' is positioned between the fifth region 505 and a sixth region 506 as shown in FIG. 8B. In the case of this embodiment, a thermosensitive first adhesive film is supplied to a first inside surface where the recording medium is folded and superposed in the first fold, and a thermosensitive second adhesive film is supplied to a second inside surface where the recording medium is folded and superposed in the second fold.

Further, in the case of the tri-fold pressure-bonding processing, either one of the three regions (501, 502, 503) on the first (surface) side is a side where the pressure-bonding is not performed, and other two regions are the pressure-bonding sides. This is also true for the three regions (504, 505, 506) on the second (surface) side. In the case of the pressure-bonding postcard, an address or the like is printed on the first side shown in FIG. 8A in many instances. In the case where the pressure-bonding sides are the second region 502 and the third region 503 on the first side shown in FIG. 8A, the pressure-bonding sides on the second side shown in FIG. 8B are the fourth region 504 and the fifth region 505. The image data may contain information on the toner image formed on a non-pressure-bonding side in addition to information on the toner images formed on these pressure-bonding sides.

In the case of this embodiment, as described above, the double-side printing is carried out in a manner such that a side where a toner use amount of the toner use amount at the first inside surface (502, 503) on the first surface side and the toner use amount at the second inside surface (504, 505) on the second surface side is small is the first side and that a side where the toner use amount is large is the second side. In the case of the first example, the toner use amount in the second region 502 is equal to the toner use amount in the third region 503, and the toner use amount in the fourth region 504 is equal to the toner use amount in the fifth region 505. Further, for the toner use amount acquired on the basis of the image data, {(second region 502)+(third region 503) (first inside surface)}<{(fourth region 504)+(fifth region 505) (second inside surface)}>(sixth region 506)>(first region 501) holds.

As described above, the toner use amount in {(second region 502)+(third region 503) (first inside surface)} is larger than the toner use amount in {(fourth region 504)+(fifth region 505) (second inside surface)}. Therefore, the double-side printing is carried out so that the toner image of FIG. 8A defined on the basis of the image data so as to be formed on the first side is formed on the second side of the recording medium and so that the toner image of FIG. 8B defined on the basis of the image data so as to be formed on the second side is formed on the first side of the recording medium. That is, the toner image of FIG. 8A is formed on the second side of the recording medium after the toner image of FIG. 8B is formed on the first side of the recording medium so that the image formation order is reverse to the image formation order defined in the image data. That is, in the case of the first example, the image formation order defined in the image data is changed, so that the toner image formed on the second side of FIG. 8A passes through the fixing device 8 once, and the toner image formed on the first side of FIG. 8B passes through the fixing device 8 once.

In the case of the second example shown in FIGS. 9A and 9B, the toner use amount in a second region 702, the toner use amount in a third region 703, and the toner use amount in a fourth region 704 are equal to each other. Further, the toner use amount in a fifth region 705, and the toner use amount in a sixth region 706 are equal to each other. Further, for the toner use amount acquired on the basis of the image data, {(fourth region 704)+(fifth region 705) (second inside surface)}>(sixth region 706)<{(second region 702)+(third region 703) (first inside surface)}>(first region 701) holds.

As described above, the toner use amount in {(fourth region 704)+(fifth region 705) (second inside surface)} is larger than the toner use amount in {(second region 702)+(third region 703) (first inside surface)}. Therefore, in the case of the second example, the double-side printing is carried out so that the toner image of FIG. 9A defined on the basis of the image data so as to be formed on the first side is formed on the first side of the recording medium and so that the toner image of FIG. 9B defined on the basis of the image data so as to be formed on the second side is formed on the second side of the recording medium. That is, the toner image of FIG. 9B is formed on the second side of the recording medium after the toner image of FIG. 9A is formed on the first side of the recording medium in the image formation order defined in the image data. That is, in the case of the second example, the toner image formed on the first side of FIG. 9A passes through the fixing device 8 twice, and the toner image formed on the second side of FIG. 9B passes through the fixing device 8 once.

In the case of the third example shown in FIGS. 10A and 10B, the toner use amount in a second region 902, the toner use amount in a third region 903, the toner use amount in a fourth region 904, and the toner use amount in a sixth region 906 are equal to each other. Further, the toner use amount in a first region 901 and the toner use amount in a fifth region 906 are equal to each other. Further, the toner use amount on entirety of the first side shown in FIG. 10A and the toner use amount on entirety of the second side shown in FIG. 10B are equal to each other. However, for the toner use amount acquired on the basis of the image data, {(fourth region 904)+(fifth region 905) (second inside surface)}>(first region 901)<{(second region 902)+(third region 903) (first inside surface)}>(sixth region 906) holds.

As described above, in the third example, the toner use amount of the image, as the image data, shown in FIG. 10A (first side), and the toner use amount of the image, as the image data, shown in FIG. 10B (second side) are equal to each other. However, the toner use amount in {(fourth region 904)+(fifth region 905) (second inside surface)} is larger than the toner use amount in {(second region 902)+(third region 903) (first inside surface)}. Therefore, in the case of the third example, the double-side printing is carried out so that the toner image of FIG. 10A defined on the basis of the image data so as to be formed on the first side is formed on the first side of the recording medium and so that the toner image of FIG. 10B defined on the basis of the image data so as to be formed on the second side is formed on the second side of the recording medium. That is, the toner image of FIG. 10B is formed on the second side of the recording medium after the toner image of FIG. 10A is formed on the first side of the recording medium in the image formation order defined in the image data. That is, in the case of the third example, the toner image formed on the first side of FIG. 10A passes through the fixing device 8 twice, and the toner image formed on the second side of FIG. 10B passes through the fixing device 8 once.

As described above, in this embodiment, in order to suppress a lowering in adhesive force on the pressure-bonding side of the pressure-bonding postcard, the toner image on a side, of the first pressure-bonding side and the second pressure-bonding side, larger in toner use amount is formed on the second side. This is because the wax as a parting agent is liable to be deposited on the toner surface by heat with a larger toner use amount of the toner image and therefore a lowering in adhesive property between the UV varnish and the toner image is suppressed by forming the toner image with the larger toner use amount on the second side.

<Evaluation of Adhesive Property>

The present inventors conducted an experiment for evaluating an adhesive property between the UV varnish and the toner image depending on the toner use amount. In the experiment, a toner image was formed on a recording medium S ("Coated Cardboard", 270 g/$m^2$, manufactured by Hokuetsu Package Co., Ltd.) in a toner use amount of 1.2 mg/$cm^2$ at a process speed of 464 mm/s, and then was fixed by the fixing device. Further, a melting point of wax contained in toner used is 77° C., and a toner softening point is 104° C.

Then, when a fixing roller for heating the recording medium S is in a state in which a temperature thereof is 180° C., the recording medium S was passed through the nip of the fixing device. After the toner image was fixed, varnish ("UV VECTA Coating Varnish PC-3KW2", manufactured by T&K TOKA Corporation) was coated in a thickness of 5 μm by a bar coater. Thereafter, the varnish was cured by irradiation with ultraviolet rays with use of a high-pressure mercury-vapor lamp so that an integrated light quantity is 120-130 mJ/$cm^2$.

Figure 11:
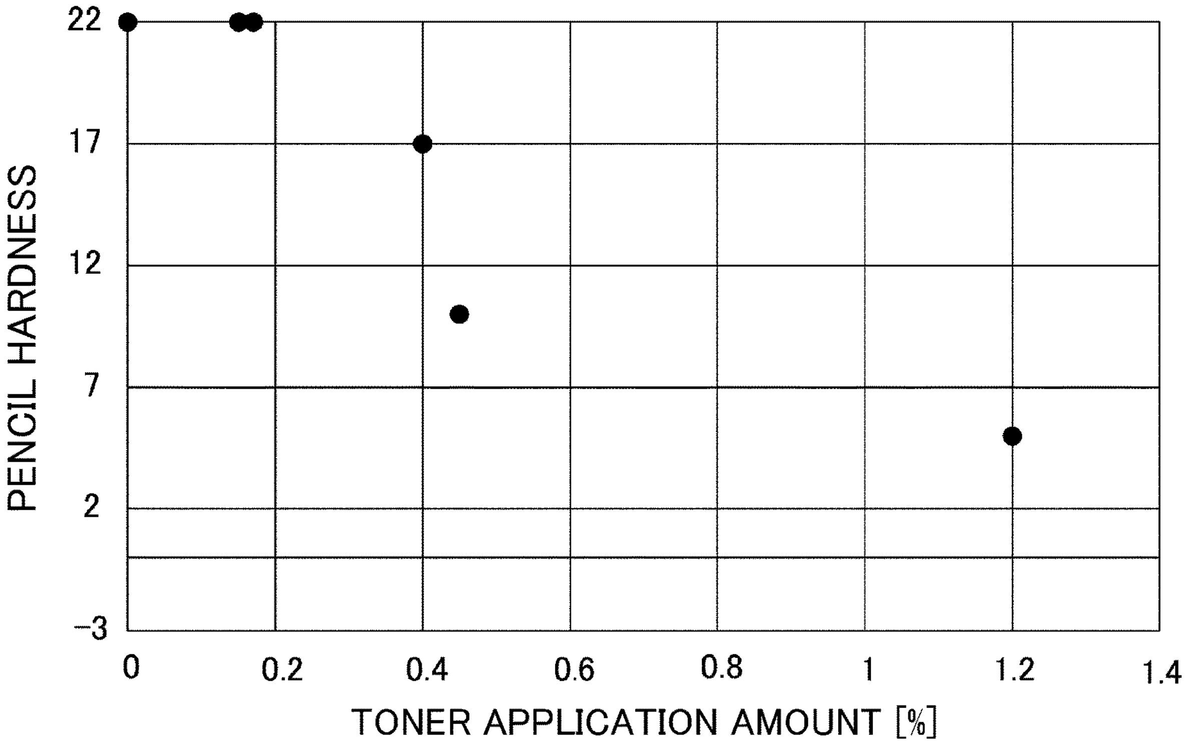
FIG. 11 is a graph showing a result of a scratch hardness test for illustrating a toner use amount and an adhesive property.

The evaluation of the adhesive property between the UV varnish and the toner image was made by scratch hardness (pencil method) which is standardized by "JIS K5600-5-4". FIG. 11 shows a result of the scratch hardness test as an adhesive property evaluation of coating on the toner image in the above-described experiment. In FIG. 11, the ordinate represents a numerical value represented by numerals from 1 to 22 for 22 stages of the pencil hardness from B10 to H10 on condition that a pencil B10 is "1" and a pencil H10 is "22".

As can be understood from the result shown in FIG. 11, a level of the adhesive property lowers when a toner application amount, i.e., the toner use amount increases. Further, as in the above-described adhesive property evaluation result (see, FIG. 5), it turns out that even in the case of the tri-fold pressure-bonding processing, similarly as in the case of the bi-fold pressure-bonding processing, a level of the adhesive property is better in the "SHEET PASSING (TWICE)" than in the "SHEET PASSING (ONCE)".

Thus, in the second embodiment, the toner image large in toner use amount is formed on the second side of the recording medium and then the recording medium is subjected to the pressure-bonding processing, so that the deposition amount of the wax from the toner on the pressure-bonding side is suppressed compared with the case where the toner image large in toner use amount is formed on the first side of the recording medium. This is due to the following reason. That is, the wax contained in the toner is deposited on the toner surface under application of pressure in a larger amount, and therefore, it becomes difficult to ensure an adhesive force on the pressure-bonding side by the varnish or the adhesive film. Further, as described above, the toner image formed on the first side passes through the nip of the fixing device 8 twice, and therefore, compared with the case where such a toner image passes through the nip of the fixing device once, the deposition amount of the wax from the toner increases by heat of the fixing device 8. Accordingly, when the toner image large in toner use amount is formed on the first side of the recording medium, the deposition amount of the wax from the toner increases, so that the adhesive property between the toner image and the adhesive layer such as the varnish or the film on the first pressure-bonding side which is the first surface side is not ensured, and thus unintended peeling is liable to occur on the recording medium S.

Therefore, in view of the above-described situation, in the second embodiment, the toner image large in toner use amount in which the deposition amount of the wax becomes large is formed on the second side. The toner image formed on the second side passes through the fixing device 8 only once, and thus compared with the case of passing of the toner image through the fixing device 8 twice, the deposition amount of the wax from the toner can be suppressed. Thus, the toner use amount is reduced by forming the toner image small in toner use amount on the first side, so that the deposition amount of the wax from the toner on the first pressure-bonding side (first side) can be suppressed. Further, the toner image large in toner use amount is formed on the second side, and is prevented from passing through the fixing device 8 twice, so that the deposition amount of the wax from the toner on the second pressure-bonding side (second side) can be suppressed. By this, the adhesive property between the adhesive film and the toner image can be improved.

As described above, in this embodiment, in the case where the varnish-applied surfaces (sides) of the recording medium S on which the toner images are formed on the double sides are folded in three (Z-shaped folding) so as to oppose each other, the toner image, of the toner images formed on the front and back pressure-bonding sides, large in toner use amount is formed on the second side of the recording medium S, so that a deposition amount of the wax from the toner image formed on the pressure-bonding side can be suppressed. By this, the adhesive property between the varnish and the toner image can be improved, so that it is possible to suppress that unintended peeling occurs between the varnish-formed layer and the toner image-formed layer.

Incidentally, in this embodiment, a constitution in which information as to which side is selected as the pressure-bonding side on the basis of the image data is included was described, but the present invention is not limited thereto. For example, as in the first embodiment, the pressure-bonding side may be selected on the basis of setting by the user through the operating portion 700 or the like. Further, the main controller 101 may carry out control so as to select the pressure-bonding side and then to form the pressure-bonding side as the second side of the recording medium S. For example, the control may be carried out by detecting an address side on the basis of inputted image data and then by using the side, where the address side is not detected, as the pressure-bonding side.

OTHER EMBODIMENTS

Incidentally, when the constitution in which the above-described pressure-bonding print preparing processing is executed is employed, the controller for controlling the image forming system 1X (1XA) may be provided in any casing. For example, a constitution in which the controller for controlling entirety of the image forming system 1X (1XA) is the above-described main controller 101 or an external controller, or is provided inside any one of the apparatuses of the pressure-bonding processing apparatus 200, and executes the above-described pressure-bonding print preparing processing (FIG. 3, FIG. 7) may be employed.

Incidentally, in the above-described embodiments, the image forming system 1X in which the pressure-bonding processing apparatus 200 is connected as a different casing to the apparatus main assembly of the image forming apparatus 100 was described as an example, but the pressure-bonding processing apparatus 200 may be provided inside the apparatus main assembly (inside the same casing) of the image forming apparatus 100. In that case, the main controller 101 also operates as the varnish processing controller 330 (or the film supply controller 830), the folding processing controller 430, and the pressure-bonding processing controller 630, which are described above.

According to the present invention, in the case where the recording medium on which the toner images are formed on the double sides is folded and thus the pressure-bonding print is prepared, an image defect after the peeling can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2021-140212 filed on Aug. 30, 2021 and 2022-102935 filed on Jun. 27, 2022, which are hereby incorporated by reference herein in its entirety.

What is claimed is:

1. An image forming system comprising:

an image forming unit configured to form an image on a first surface of a recording material and to form an image on a second surface, opposite from the first surface, of the recording material;

an application unit configured to apply an adhesive onto the second surface of the recording material;

a folding unit configured to fold the recording material in two so that the second surface, on which the adhesive is applied, is inside;

a pressure-bonding unit configured to pressure-bond the recording material folded in two; and a control unit configured to (1) control conveyance of the recording material, (2) cause the image forming unit to form the image on the first surface of the recording material, (3) convey the recording material with the image having been formed on the first surface thereof to the image forming unit again without conveying to the application unit, and cause the image forming unit to form the image on the second surface of the recording material, (4) convey the recording material with the image having been formed on the second surface thereof to the application unit, and cause the application unit to apply the adhesive to the second surface of the recording material and not to apply the adhesive to the first surface, (5) convey the recording material to which the adhesive has been applied to the folding unit, and cause the folding unit to fold the recording material in two so that the second surface is inside, and (6) convey the recording material having been folded in two to the pressure-bonding unit, and cause the pressure-bonding unit to pressure-bond the recording material, wherein in a case in which the controller causes the image forming unit to form a first image and a second image, (7) when the controller receives an instruction to form the first image on a pressure-bonding side which is an inner of the recording material folded in two, the controller causes the image forming unit to form the second image on the first surface and the first image on the second surface, and (8) when the controller receives the instruction to form the second image on the pressure-bonding side, the controller controls an image forming order so as to cause the image forming unit to form the first image on the first surface and the second image on the second surface.

2. An image forming system according to claim 1, wherein the application unit is configured to apply varnish as the adhesive onto a surface of the recording material to be an inner surface, wherein the image forming system further comprises an irradiation unit configured to irradiate, with ultraviolet radiation, the varnish applied by the application unit, wherein the folding unit is configured to fold the recording material in two so that the surface on which the varnish is applied by the application unit becomes an inner surface of the recording material folded in two, and wherein the pressure-bonding unit is configured to pressure-bond the recording material folded in two by applying heat and pressure to the recording material.

3. An image forming system according to claim 1, further comprising a supplying unit for supplying a thermosensitive adhesive film as the adhesive to an inner surface of the recording material folded by the folding unit, wherein the pressure-bonding unit is configured to pressure-bond the recording material folded in two by applying heat and pressure to the recording material.

4. An image forming system according to claim 1, further comprising an input portion through which a user inputs information for designating a surface of the recording material to be an inner surface of the recording material folded into two, wherein the control unit controls the image forming unit on the basis of the information inputted through the input portion.

5. An image forming system according to claim 4, wherein the input portion includes a display portion for displaying (1) a first button corresponding to the first surface and (2) a second button corresponding to the second surface, and wherein the surface of the recording material corresponding to the button selected by the user among the first button and the second button is designated as the inner surface.

* * * * *